(12) United States Patent
Dohi

(10) Patent No.: US 7,950,888 B2
(45) Date of Patent: May 31, 2011

(54) SELF-PENETRATING SCREW

(75) Inventor: Yuji Dohi, Osaka (JP)

(73) Assignee: Japan Power Fastening Co., Ltd., Osaka (JP)

( * ) Notice: Subject to any disclaimer, the term of this patent is extended or adjusted under 35 U.S.C. 154(b) by 312 days.

(21) Appl. No.: 11/784,811

(22) Filed: Apr. 10, 2007

(65) Prior Publication Data

US 2008/0014047 A1 Jan. 17, 2008

(30) Foreign Application Priority Data

Apr. 13, 2006 (JP) ................... 2006-110509
Apr. 25, 2006 (JP) ................... 2006-120773

(51) Int. Cl.
*F16B 35/04* (2006.01)
(52) U.S. Cl. ........................ 411/412; 411/424
(58) Field of Classification Search .............. 411/411, 411/412, 424, 386, 387.3
See application file for complete search history.

(56) References Cited

U.S. PATENT DOCUMENTS

| | | | |
|---|---|---|---|
| 3,233,500 A * | 2/1966 | Devellier | 411/413 |
| 3,524,378 A * | 8/1970 | Wieber | 411/387.3 |
| 3,703,843 A * | 11/1972 | Laverty | 411/413 |
| 4,329,099 A * | 5/1982 | Shimizu et al. | 411/412 |
| 5,190,426 A * | 3/1993 | Wieder et al. | 411/412 |
| 5,259,398 A * | 11/1993 | Vrespa | 128/898 |
| 5,863,167 A | 1/1999 | Kaneko | |
| 6,086,303 A * | 7/2000 | Fluckiger | 411/399 |

FOREIGN PATENT DOCUMENTS

| | | |
|---|---|---|
| CN | 2363111 Y | 2/2000 |
| JP | 60-23614 | 2/1985 |
| JP | 9-60626 | 3/1997 |
| JP | 9-273526 | 10/1997 |
| JP | 10-246214 | 9/1998 |
| JP | 11-006509 | 1/1999 |
| JP | 2000-266020 | 9/2000 |
| JP | 2001-200822 | 7/2001 |

* cited by examiner

*Primary Examiner* — Gary Estremsky
(74) *Attorney, Agent, or Firm* — Jordan and Hamburg LLP

(57) ABSTRACT

A screw includes a shaft, a trumpet-shaped head provided to a base end of the shaft, and a narrow-tip portion formed at a tip end of the shaft. The shaft has different diameters at a small-diameter portion contiguous to the narrow-tip portion and at a large-diameter portion contiguous to the head. Two screw threads are formed on the small-diameter portion and one screw thread is formed on the large-diameter portion. Therefore, a thread portion can be divided into a double-thread portion and a single-thread portion. It is preferable that the screw threads forming the double-thread portion have different heights. The screw is mainly used for fastening a plasterboard to a frame member.

3 Claims, 5 Drawing Sheets

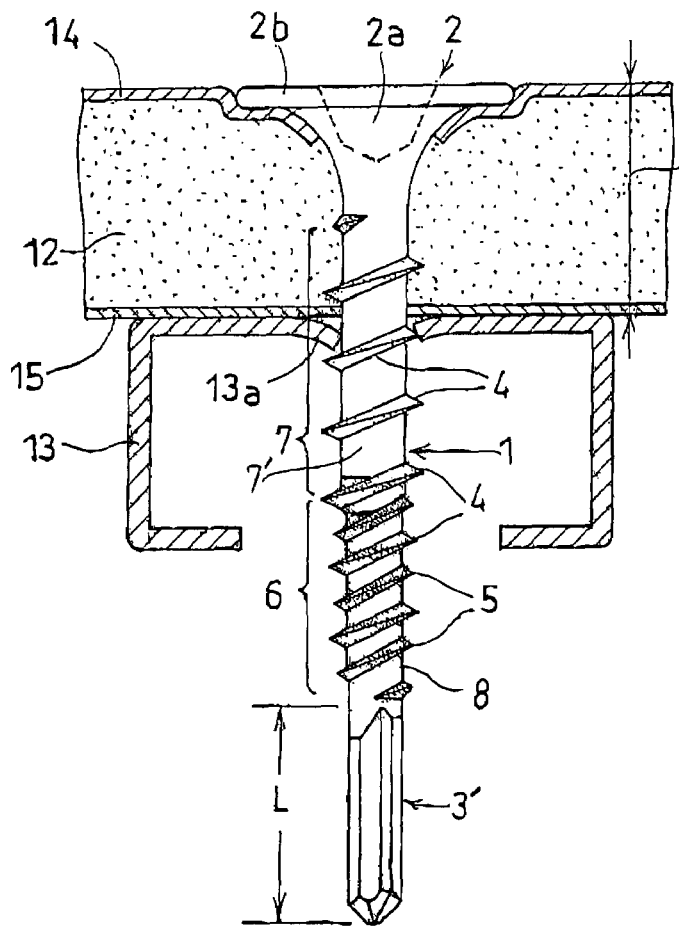
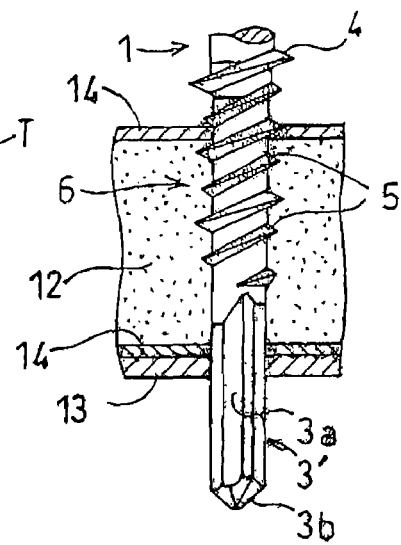
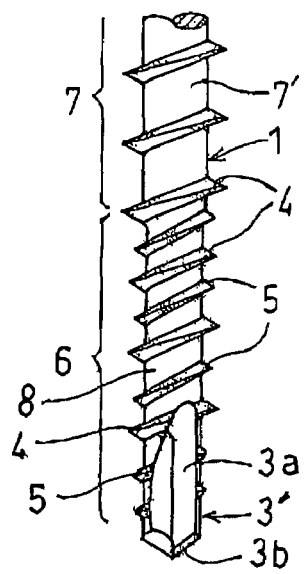
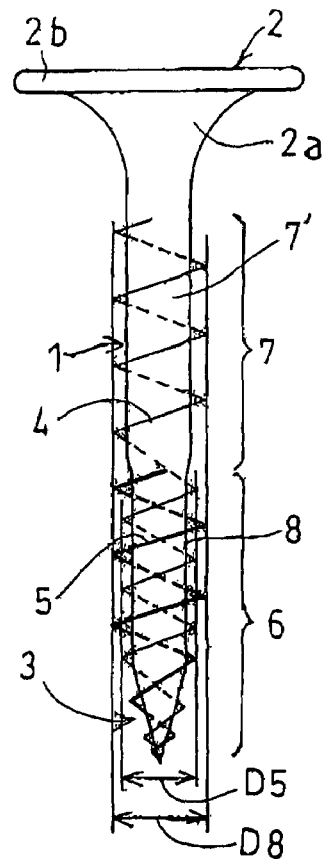

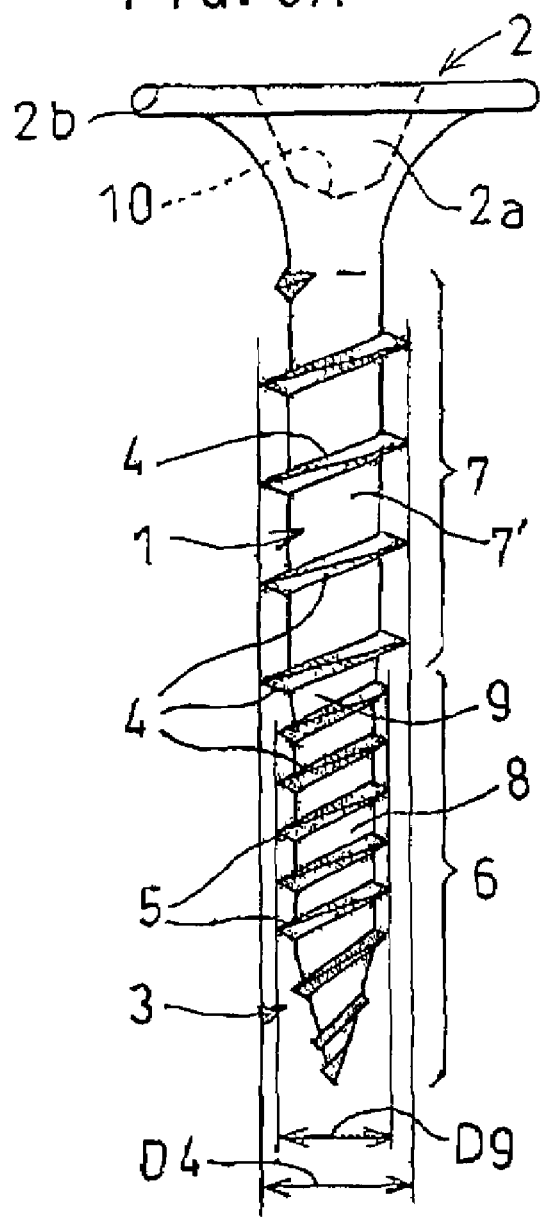
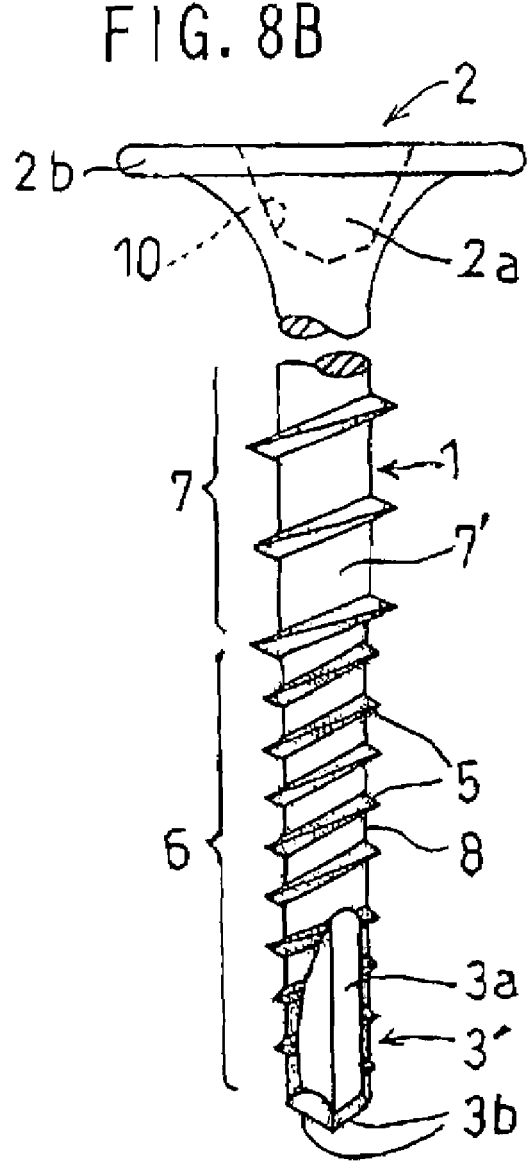

SELF-PENETRATING SCREW

BACKGROUND OF THE INVENTION

1. Field of the Invention

The present invention relates to a self-advancing screw suitable for fastening of a plasterboard. In the following description, the self-advancing screw will be simply referred to as the "screw" in many cases.

2. Description of the Related Art

The self-advancing screws are broadly divided into a narrow-tip type having a pointed tip end and a drill type in which a drill portion having a cutting edge is provided to a tip end, in terms of the shape of the tip end portion. The former narrow-tip-type screw is typified by a wood screw. The narrow-tip-type screw spreads out tissue of a member with its tip end portion to allow its shaft to advance into the member, and is often used for fastening various kinds of workpieces to a base made of soft material such as wood or a base made of a thin steel sheet of a thickness of about 0.5 to 0.8 mm.

The drill-type screw is often used for fastening various workpieces to a base made of a steel sheet in general, e.g., fastening a workpiece made of a steel sheet to a base made of a steel sheet or fastening a wooden workpiece to a base made of steel. It is needless to say that the screw is also used for fastening a workpiece to a soft material such as a wooden base (see Japanese Patent Application Laid-open No. 2002-31115, for example).

For both the types of screws, a variety of improvements have been proposed conventionally. For example, with regard to the narrow-tip-type screw, two screw threads are formed on a shaft, and many variations have been proposed based on this double-thread type. Examples of the variations are as follows.

For example, there is a screw disclosed in Japanese Patent Application Laid-open No. 2001-200822. In the screw the whole thread portion of which is formed of two screw threads, a certain area of the thread portion located on a head side is formed as the same height portion in which the two screw threads have the same heights (or outside diameters) and a portion of the thread portion located on a tip end side of the same height portion is formed as a different height portion in which the two screw threads have different heights (or outside diameters).

There is also a screw disclosed in Japanese Patent No. 3334563, in which, in the case where the whole thread portion is formed of two screw threads, the thread portion is divided into three parts, i.e., a small-diameter parallel thread portion located on a tip end side, a large-diameter parallel thread portion located on a head side, and a tapered intermediate thread portion smoothly connecting the small-diameter parallel thread portion and the large-diameter parallel thread portion.

There is also a screw disclosed in Japanese Patent No. 3413828, in which, in the case where the whole thread portion is formed of two screw threads, the thread portion is divided into three parts, i.e., a straight lower thread portion located on a tip end side, a straight upper thread portion located on a head side, and an intermediate thread portion located between the lower thread portion and the upper thread portion. Moreover, the relationship between outside diameters of the thread portions is set to be "the outside diameter of the lower thread portion<the outside diameter of the intermediate thread portion<the outside diameter of the upper thread portion".

There is also a screw disclosed in Japanese Patent No. 3487210. In the case where the whole thread portion is formed of two screw threads, a certain area of the thread portion on a tip end side is formed as a small-diameter portion in which screw threads are extremely low, and a portion of the thread portion located on a head side of the small diameter portion is formed as a large-diameter portion in which screw threads are high.

Furthermore, a screw disclosed in Japanese Patent No. 3060284 includes a single-thread portion located on a tip end side and a double-thread portion located on a head side of the single-thread portion. An outside diameter of the single-thread portion is set of a smaller dimension than an outside diameter of the double-thread portion, and a height of a screw thread of the single-thread portion is set to be much smaller than heights of screw threads of the double-thread portion.

There are screws disclosed in Japanese Patent Application Laid-open No. 60-23614 and Japanese Patent Application Laid-open No. 9-273526. In each of the screws, a shaft has different diameters, i.e., diameters of a small-diameter portion located on a tip end side and of a large-diameter portion located on a head side. One screw thread extends throughout the small-diameter portion and the large-diameter portion.

SUMMARY OF THE INVENTION

One of uses of the self-advancing screw is fastening of a plasterboard forming a wall or a ceiling of a building to a frame member (which may be called a "base"). As the frame member to which the plasterboard is fastened, wood has been used frequently in the past. In recent years, however, a frame member formed of a thin steel sheet having a thickness of about 0.5 to 0.8 mm and a substantially C-shaped cross section is often used so as to increase fire resistance and durability. The screw of Japanese Patent No. 3060284 was developed as a screw suitable for fastening the plasterboard to the frame member made of the thin steel sheet. An object of the present invention is to prevent deformation of the frame member on impact when the shaft of the screw advances into the frame member. To put it more specifically, in the invention described in this official gazette, the tip end side of the thread portion is formed as the small-diameter single-thread portion to thereby reduce driving resistance against the frame member.

In the screw described in each of Japanese Patent Application Laid-open No. 2001-200822, Japanese Patent No. 3334563, Japanese Patent No. 3413828, Japanese Patent No. 3487210, and Japanese Patent No. 3060284, the whole thread portion is formed as the double-thread portion or a proper area on the tip end side of the thread portion is formed as the single-thread portion while the other portion is formed as the double-thread portion. In each of the cases, the double-thread portion is screwed into the base to fasten the workpiece to the base. With these prior-art configurations, however, the tissue of the workpiece may collapse excessively or force of the screw thread for holding the base may be reduced on the contrary when the workpiece is brittle material such as a plasterboard.

The present invention has been made in view of the above-described circumstances, and it is an object of the present invention to provide an improved self-advancing screw.

<<Subject Matter of the Invention>>

A self-advancing screw according to the present invention includes a shaft having a circular cross section and a head contiguously provided to a base end of the shaft. A tip end portion of the shaft on an opposite side to the head is formed as a self-advancing portion for advancing into members without a prepared hole. The self-advancing portion is any one of a narrow-tip portion having a pointed extreme tip end or a drill portion having a cutting edge. Therefore, the present invention is applicable to both the narrow-tip-type self-advancing screw and the drill-type self-advancing screw. The shaft is formed with screw threads for digging into the members. On the other hand, the head has a trapezoidal cone portion with its outside diameter increasing from a portion connected to the shaft toward a top face, and a fitting portion in which a driver bit is to be fitted is formed in the top face of the head. The foregoing is the basic configuration of the present invention.

In the above basic configuration, the present invention includes additional configurations in which "the shaft has a small-diameter portion contiguous to the self-advancing portion and a large-diameter portion contiguous to the head, the small-diameter portion and the large-diameter portion are contiguous with a tapered portion interposed between them", "the small-diameter portion of the shaft is provided with the two screw threads including the first screw thread and the second screw thread, only the first screw thread out of both the screw threads extends close to the head, and therefore the small-diameter portion of the shaft is formed as a double-thread portion and the large-diameter portion is formed as a single-thread portion", and "an outside diameter of the single-thread portion is greater than or substantially the same as a maximum outside diameter of the double-thread portion".

Although the words "the same" are used to specify the configuration in the present invention, "the same" does not mean "completely the same" but includes "substantially the same". Moreover, a little working error may occur in an actual product. The screw is used for fastening one object and another object placed on each other. In the present specification, the object held by the head of the screw is referred to as a "workpiece", and the object on which the workpiece is placed is referred to as a "base". The "members" include both the workpiece and the base.

One of advantages of the double-thread thread portion of the self-advancing screw is that a lead angle of the screw thread can be increased to thereby swiftly carry out screwing in. In the present invention, because the double-thread portion is located on the tip end side, the double-thread portion advances first into the workpiece and the base in fastening the workpiece to the base. Because a pitch is small in the double-thread portion, stability of a posture of the screw is excellent (if there is only one screw thread and the lead angle is large, the screw tends to get out of balance and fall when screwed in).

When the whole screw thread is formed as the double thread, there is a risk that tissue of the members (the workpiece and the base) is collapsed excessively or deformed excessively due to advancement of the thread (especially when the workpiece is the plasterboard, the plasterboard is brittle and therefore the collapse phenomenon of the tissue is pronounced). In the present invention, because the head-side portion of the screw thread is the single-thread portion, it is possible to prevent or suppress excessive collapse or excessive deformation of the members.

Moreover, because the tip-end-side portion of the shaft of the screw is formed as the small-diameter portion and the head-side portion is formed as the large-diameter portion in the present invention, the large-diameter portion securely digs into the members (and especially the workpiece), which also prevents or suppresses the collapse phenomenon of the members.

In summary, with the present invention, it is possible to swiftly screw in the screw in a correct posture while preventing collapse and excessive deformation of the members (and especially the workpiece).

As already described, there are the case in which the self-advancing portion is of the narrow-tip type and the case in which the self-advancing portion is of the drill type in the screw according to the present invention. In general, the narrow-tip type is used when the material of the base is wood or a steel sheet of about 0.8 mm or thinner, and the drill type is used when the material is a steel sheet thicker than 0.8 mm. Of course, this distinction is merely a guide and a user has a choice about which type to actually use.

<<Variations>>

The present invention includes some variations as will be described below. A first variation mainly relates to a configuration of the head. In other words, in the first variation, a bearing surface of the trapezoidal cone portion forming the head of the screw has a profile including an outline curved to be recessed from outside in a vertical cross-sectional front view taken along a plane including an axis, which forms the head in a shape similar to a tip end portion of a trumpet. This form of the head is conventionally known as a form suitable for the screw for fastening the plasterboard. This trumpet-shaped head is suitable for fastening of the plasterboard because tissue of a front face portion of the plasterboard is collapsed little by the head and a contact area between the bearing surface of the head and the plasterboard is so large that performance of holding the plasterboard with the head is high.

As can be understood from the description of the first variation, the "trapezoidal cone shape" in the present invention includes the shape having a curved shape of the bearing surface and the shape having a straight shape of the bearing surface in a vertical cross-sectional front view.

In the first variation, the trapezoidal cone portion forming a main body of the head includes a flat flange portion overhanging outward from an outer periphery of an end of the trapezoidal cone portion, and an outside diameter of the flange portion is 2.5 to 3.5 times a maximum outside diameter of the screw threads.

In a small screw such as a wood screw, the outside diameter of the head is typically twice the maximum outside diameter of the thread portion (this maximum outside diameter of the thread portion is defined as the outside diameter of a screw in general). Because the outside diameter of the head is much greater than that of the conventional screws in the present invention, the performance of holding the workpiece is extraordinarily high. Moreover, because the diameter is increased not by increasing the diameter of the whole trapezoidal cone of the head but by arranging the flange portion, tissue of the workpiece is not excessively collapsed. Because the workpiece is not excessively collapsed and a held area of the workpiece is large as described above, it is possible to obtain high fastening strength.

In the case of the screw used for the plasterboard, the holding performance of head is not sufficient when the outside diameter of the flange portion is smaller than about 2.5 times the outside diameter of the thread portion. When the diameter of the flange portion exceeds about 3.5 times the outside diameter of the thread portion, the flange portion becomes less liable to sink into the plasterboard. In an experiment, the outside diameter of the flange portion which is about three times the outside diameter of the thread portion was suitable.

In recent years, recycling has been promoted in various fields. In the case of the plasterboard, waste plasterboards are crushed and mixed into virgin material. The plasterboard into which the recycled product has been mixed is brittler than the plasterboard including the virgin material only. Moreover, there is a trend to make the plasterboard thinner, which reduces strength of the plasterboard. In the present invention, it is possible to firmly fold the workpiece with the head without excessively collapsing the workpiece, and therefore the present invention is suitable for fastening of the plasterboard into which the recycled product has been mixed or the thin plasterboard (e.g., of a thickness of 6 to 10 mm).

A second variation of the present invention also includes a preferable form of the thread portion on the shaft. More specifically, in the second variation, a space is left between bases of the adjacent screw threads. In other words, the root portion exists as a flat face between the feet of the adjacent screw threads. This characteristic suppresses excessive collapse of the members by the screw threads. Therefore, the screw is suitable for a case in which the workpiece is soft material such as the plasterboard.

The present invention also includes a contrivance related to outside diameters of the screw threads as the second variation. In other words, in the invention according to the second variation, an outside diameter of the first screw thread is greater than an outside diameter of the second screw thread in the small-diameter portion of the shaft, and an outside diameter of the first screw thread in the large-diameter portion is greater than the outside diameter of the first screw thread in the small-diameter portion.

Because the first screw thread has the greater outside diameter in the large-diameter portion than in the small-diameter portion in the second variation, the first screw thread securely digs into the workpiece at the large-diameter portion to thereby further improve the fastening performance. Furthermore, the outside diameter (or the height of the thread) of the first screw thread is smaller than that of the second screw thread in the small-diameter portion. Therefore, the workpiece is collapsed little by the second screw thread, and it is possible to reduce a screwing resistance against the members (the workpiece and the base).

The present invention also includes a configuration in which the outside diameter of the first screw thread and the outside diameter of the second screw thread are the same in the small-diameter portion of the shaft as a third variation. In this third variation, the outside diameter of the first screw thread in the large-diameter portion is greater than the outside diameters of both the screw threads in the small-diameter portion. The third variation can be said to have substantially the same advantages as the second variation.

As an advantage specific to the third variation, displacement of the shaft during screwing into the members can be expected to be suppressed due to the same outside diameters of the first screw thread and the second screw thread (i.e., the same heights of the screw threads). In other words, because the heights of the two screw threads are the same, the screwing resistances of both the screw threads are the same when the two screw threads advance into the members (the workpiece, the base), and therefore it is possible to drive the screw (shaft) straight into the members while preventing the shaft from dancing.

The second variation and the third variation can be added to the first variation. These combinations are extremely preferable as the screw for fastening the workpiece such as the plasterboard made of brittle material.

The present invention will be understood more precisely by way of the following embodiments.

BRIEF DESCRIPTION OF THE DRAWINGS

FIGS. 1A to 1D are views showing a configuration of a first embodiment, in which FIG. 1A is a front view, FIG. 1B is a front view schematically showing screw threads, FIG. 1C is a front view without showing screw threads, and FIG. 1D is a plan view;

FIGS. 3A and 3B are views showing a state of use of the screw according to the first embodiment, in which FIG. 3A shows a state in which the screw has been halfway screwed in, and FIG. 3B shows a state in which the screw has been completely screwed in;

FIGS. 4A to 4D are views showing a configuration of a second embodiment, in which FIG. 4A is a front view, FIG. 4B is a plan view, FIG. 4C is a front view without showing screw threads, and FIG. 4D is a partial sectional view, where, in FIG. 4D, parallel hatching showing a cross section is drawn only partially;

FIGS. 5A and 5B are views showing a state of use of the screw of the second embodiment, in which FIG. 5A shows a state in which the screw has been halfway screwed in, and FIG. 5B shows a state in which the screw has been completely screwed in;

FIG. 6 is a partial front view of the second embodiment;

FIG. 7 is a view showing a third embodiment, in which screw threads are illustrated schematically; and FIG. 8A is a view showing a fourth embodiment, and FIG. 8B is a view showing a fifth embodiment.

DETAILED DESCRIPTION OF THE PREFERRED EMBODIMENTS

Next, embodiments of the present invention will be described based on the drawings.

(1) Configuration of First Embodiment

Figure 1B:
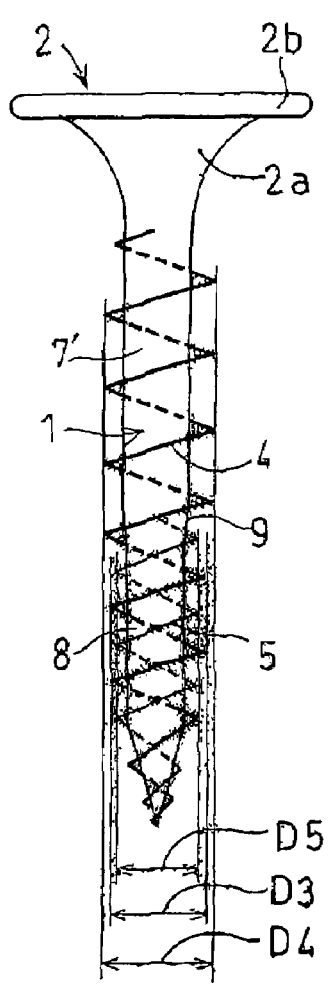
Figure 1A:
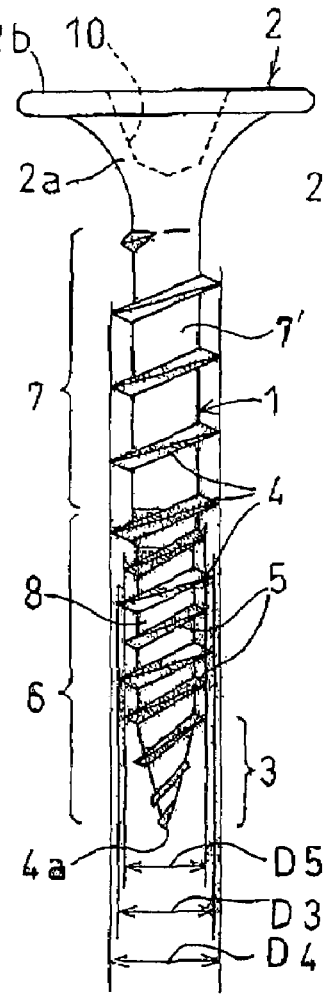
Figure 1C:
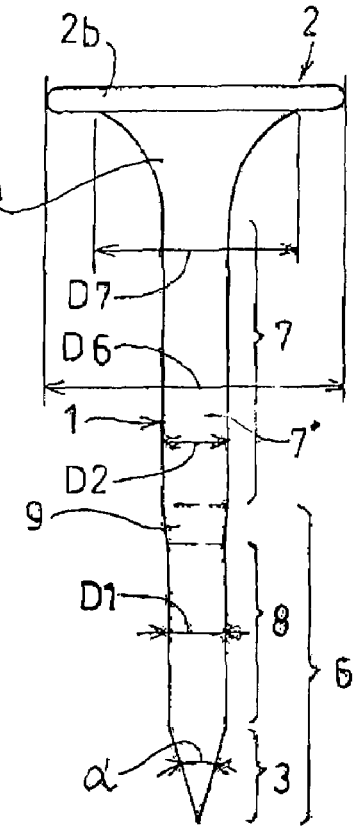
Figure 1D:
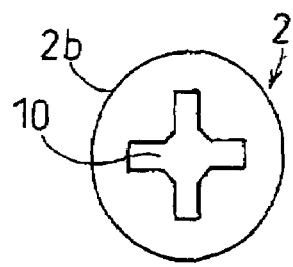
Figure 2:
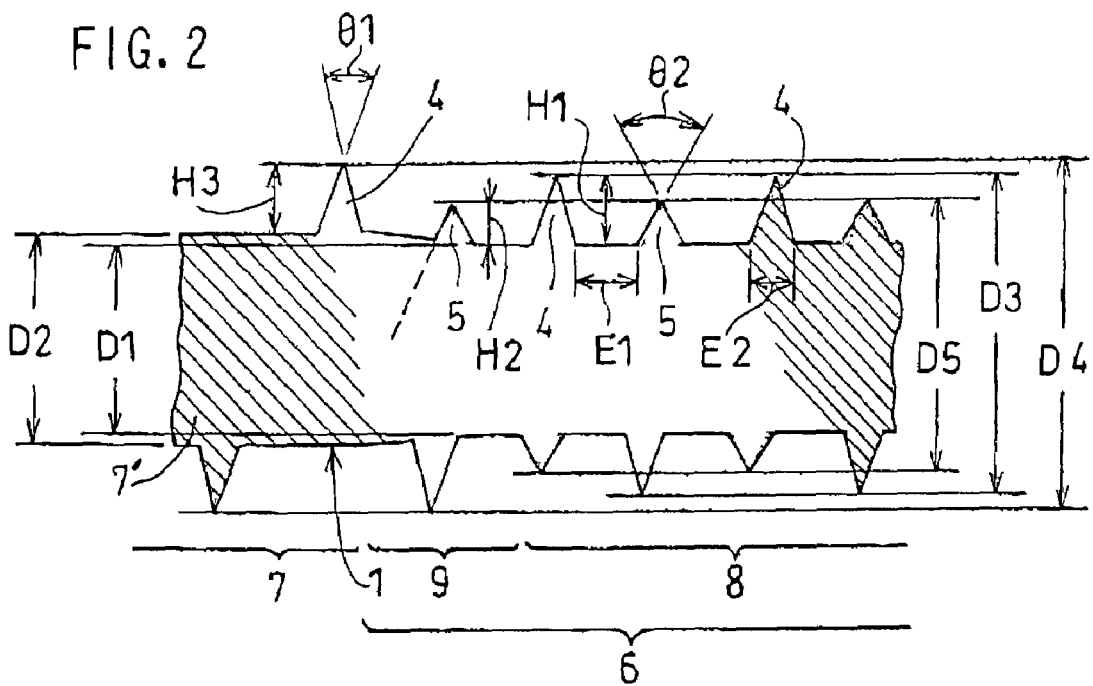
FIG. 2 is a partial sectional view of a shaft including a tapered portion, where parallel hatching showing a cross section is drawn only partially.

A configuration of a screw according to a first embodiment is shown in FIGS. 1A to 2. The screw includes a shaft 1 having a circular cross section and a head 2 integrally connected to a base end of the shaft 1. A tip end portion of the shaft 1 on a side opposite to the head 2 is formed as a narrow-tip portion 3 having a pointed extreme tip end. A taper angle α of the narrow-tip portion 3 is set to about 25 degrees (it is needless to say that the angle α can be set arbitrarily). Although the narrow-tip portion 3 of the present embodiment is in a conical shape, it may be in a bullet shape having a curved outline in a vertical cross-sectional front view.

The shaft 1 is provided with two screw threads, i.e., a first screw thread 4 and a second screw thread 5. Both the screw threads 4, 5 start (rise) from the narrow-tip portion 3. The first screw thread 4 extends to a vicinity of a neck immediately below the head 2 while the second screw thread 5 extends only about half a length of the shaft 1. Therefore, the thread portion formed on the shaft 1 can be divided into a double-thread portion 6 where both the first and second screw threads 4, 5 exist and a single-thread portion 7 where only the first screw thread 4 exists. The double-thread portion 6 is located on the tip end side of the shaft 1.

A start point (tip end) of the first screw thread 4 extends to the tip end of the narrow-tip portion 3 and a start point of the first screw thread 4 is formed as a dig-in portion 4a. The action of this dig-in portion 4a helps the shaft 1 start advancing into the member (workpiece, base). Heights of both the first screw thread 4 and second screw thread 5 gradually reduces at their end portions. The end of the second screw thread 5 is located on the back side of the sheet in FIGS. 1A and 1B.

A portion of the shaft 1 corresponding to the double-thread portion 6 is formed of the narrow-tip portion 3 forming the tip end portion, a straight small-diameter portion 8 having a constant outside diameter (root diameter with respect to the screw threads 4, 5) D1, and a tapered portion 9 having an outside-diameter increasing from the small-diameter portion 8 toward the single-thread portion 7. On the other hand, the single-thread portion 7 is formed as a large-diameter portion 7' having a greater outside diameter D2 than the small-diameter portion 8. Therefore, in the present embodiment, the single-thread portion 7 and the large-diameter portion 7' can be said to be the same.

Although it is not shown in the drawings, the large-diameter portion 7' of the shaft 1 may include a portion where the first screw thread 4 does not exist near the head 2. The second screw thread 5 may partially extend into the large-diameter portion 7' of the shaft 1. The end of the second screw thread 5 may be located on the tip end side of the end of the small-diameter portion 8. In other words, in the present invention, it is essential only that the whole or part of the small-diameter portion 8 be formed as the double-thread portion 6 and that the whole or part of the large-diameter portion 7' be formed as the single-thread portion 7.

A height H1 of the first screw thread 4 in the small-diameter portion 8 and a height H3 of the first screw thread 4 in the large-diameter portion 7' are greater than a height H2 of the second screw thread 5. The first screw thread 4 excluding its start portion and end portion has the same height. In other words, the heights H1 and H3 are the same.

Because the outside diameter (root diameter) D1 of the small-diameter portion 8 is smaller than the outside diameter (root diameter) D2 of the single-thread portion 7 (large-diameter portion 7'), an outside diameter D3 of the first screw thread 4 in the double-thread portion 6 is slightly smaller than an outside diameter D4 of the first screw thread 4 in the single-thread portion 7. Therefore, when an outside diameter of the second screw thread 5 in the double-thread portion 6 is D5, D5<D3<D4. A difference between D3 and D5 is greater than a difference between D4 and D3. Moreover, the outside diameter D5 of the second screw thread 5 is greater than the outside diameter D2 of the large-diameter portion 7' of the shaft 1.

The heights H3 and H1 may be different so that one of them is greater than the other (this is also true for the second embodiment, for example). Although both the first screw thread 4 and second screw thread 5 have different outside diameters in different positions when they are watched closely, the outside diameters D3, D4, and D5 in the present invention refer to outside diameters of portions having the constant heights of the threads in the small-diameter portion 8 and the large-diameter portion 7' where the shaft 1 extends straight.

An angle θ1 of the thread of the first screw thread 4 and an angle θ2 of the thread of the second screw thread 5 are different. To put it more specifically, θ1 is set to about 30 degrees, and θ2 is set to about 60 degrees in the case of the present embodiment. However, it is needless to say that the angles θ1, θ2 can be set arbitrarily. It is also possible to set both the angles θ1, θ2 to about the same angle.

In each of the double-thread portion 6 and single-thread portion 7, a pitch of the screw thread 4 or 5 is equal to or greater than twice a width in an axial direction of the screw thread 4 or 5. In other words, lead angles of both the screw threads are much greater than that of a normal triangular thread. Therefore, in both the double-thread portion 6 and the single-thread portion 7, a space of a certain degree of dimension E1 is left between bases of the adjacent screw threads 4, 5. In other words, a flat root can be seen between the adjacent screw threads 4, 5 in a vertical cross-sectional front view. The space dimension E1 of the space between the adjacent screw threads 4, 5 is equal to or greater than the width E2 of the foot of the screw thread 4 or 5 in the double-thread portion 6, and is equal to or greater than three times the width E2 of the foot of the first screw thread 4 in the single-thread portion 7.

The head 2 includes, as its main portion, a trapezoidal cone portion 2a having a profile curved to be recessed from outside. In other words, the head 2 includes the trapezoidal cone portion 2a in a shape similar to a head of a trumpet. To an end of the trapezoidal cone portion 2a, a flat (or ring-shaped) flange portion 2b is integrally connected. In a top face of the head 2, a cross-shaped recess 10 is formed as an example of a fitting portion in which a driver bit is to be fitted.

An outside diameter (maximum outside diameter, to be exact) D6 of the head 2 of the screw according to the present embodiment is greater than normal. In other words, an outside diameter of a head of a normal screw (e.g., wood screw) is about twice a nominal diameter (maximum outside diameter of the thread portion and D4 in the present embodiment) of the thread portion. In the present embodiment, an outside diameter (maximum diameter) D7 of the trapezoidal cone portion 2a is set to about twice the nominal diameter D4 and the outside diameter D6 of the flange portion 2b is set to about three times the nominal diameter (D4). A thickness of the flange portion 2b is set to about 0.6 to 0.8 mm.

(2) State of Use

Figure 3A:
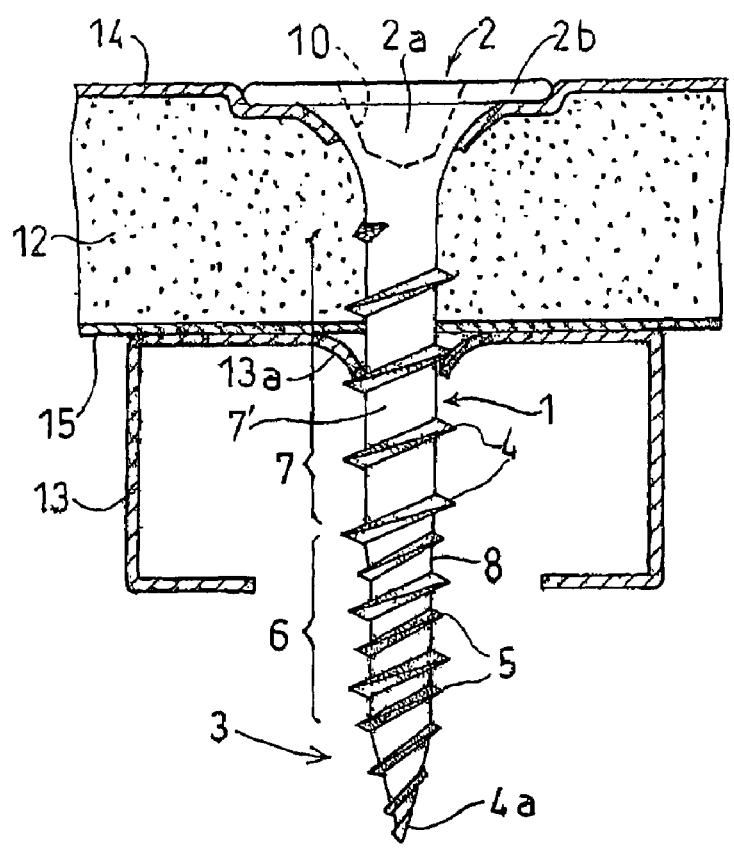
Figure 3B:
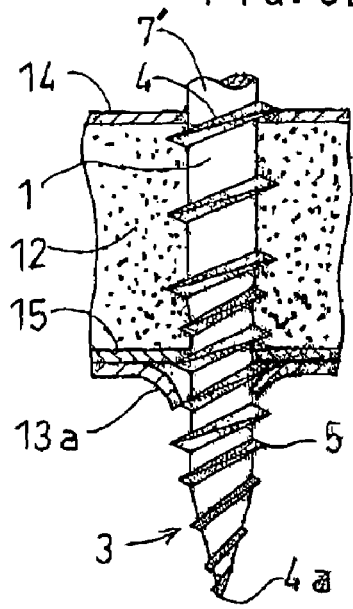
Figure 4A:
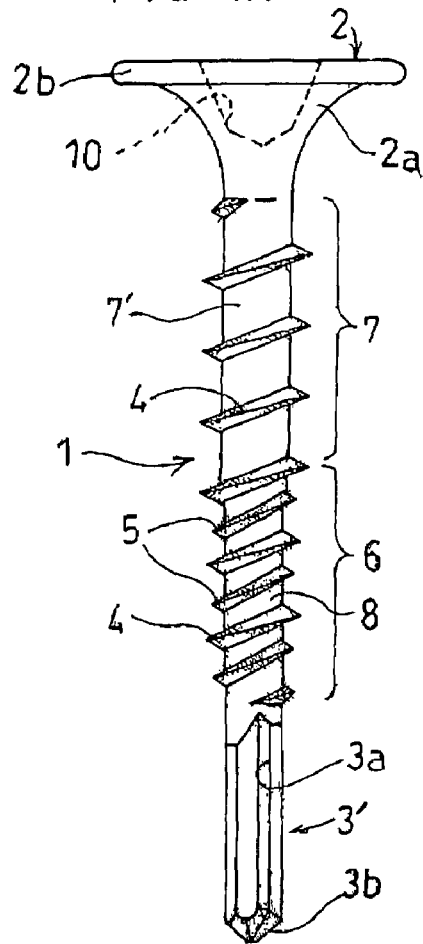
Figure 4B:
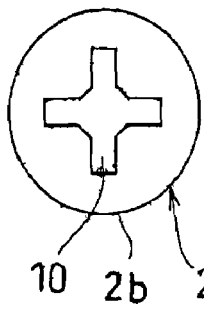
Figure 4C:
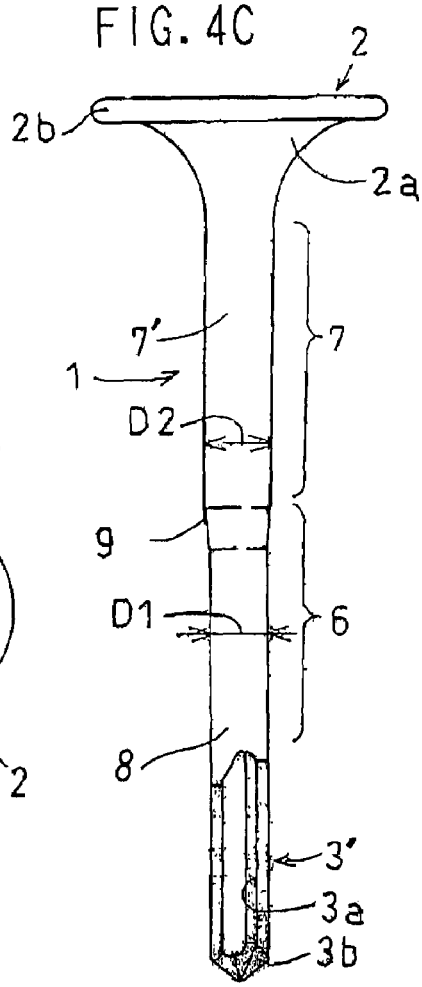
Figure 4D:
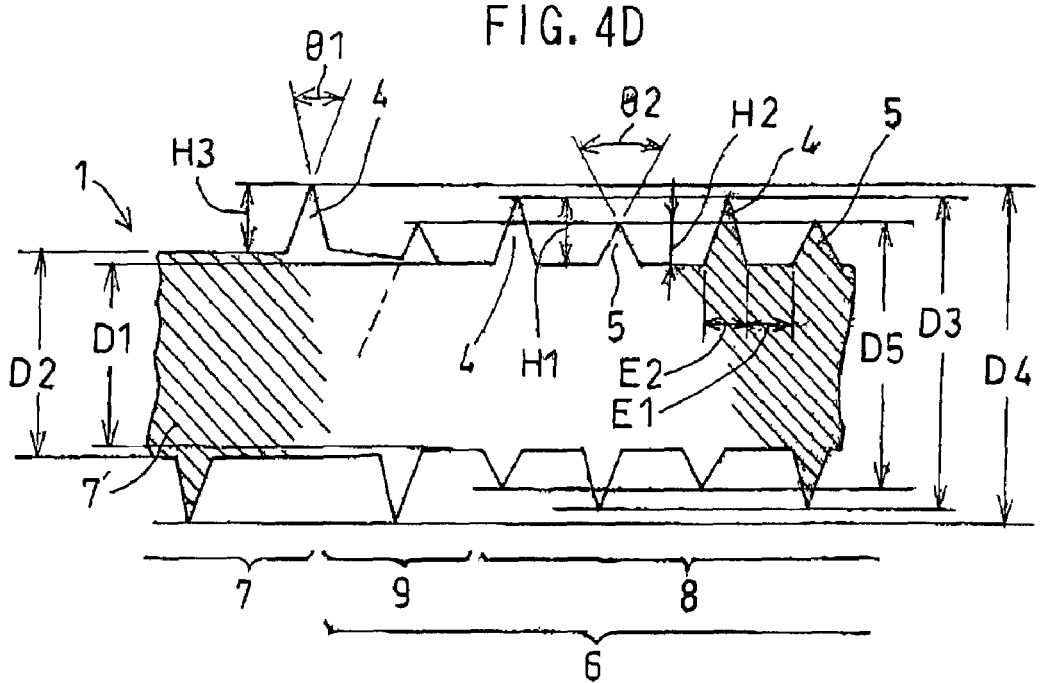

An example of a state of use of the first embodiment is shown in FIGS. 3A and 3B. In this example, the screw thread is used for fastening a plasterboard 12 to a frame member 13 made of a thin steel sheet and having a substantially C-shaped cross section. Sheets of protective paper 14, 15 are stuck on a front face and a back face of the plasterboard 12.

In screwing in the screw, the double-thread portion 6 first advances from the plasterboard 12 into the frame member 13 and then the single-thread portion 7 advances into the plasterboard 12 and the frame member 13. After the screw has been completely screwed in, the first screw thread 4 of the single-thread portion 7 holds an inner peripheral edge of the frame member 13 and the flange portion 2b of the head 2 has sunk into the plasterboard 12 (the head 2 needs to have sunk toward the back face side further from the front surface of the protective paper 14 so as to allow sticking of a sheet of decorative wallpaper (not shown) on the protective paper 14 on the front face of the plasterboard 12).

When there is only the first screw thread 4, a phenomenon in which the shaft 1 is displaced while advancing into the plasterboard 12 and the frame member 13 may occur because the lead angle of the first screw thread 4 is large. In other words, a resistance arises as the first screw thread 4 digs into the plasterboard 12 and the frame member 13, and therefore the shaft 1 tends to fall to the side opposite to a dug-in position of the first screw thread 4. Because the dug-in position successively changes as the shaft 1 rotates, the phenomenon in which the screw is displaced about an axis occurs.

In the present invention, on the other hand, the double-thread portion 6 is located on the tip end side, and therefore the double screw threads 4, 5 dig into the plasterboard 12 and the frame member 13 on opposite sides of the axis. Thus, resistances of the opposite screw threads 4, 5 against the plasterboard 12 and the frame member 13 cancel each other out to suppress the phenomenon in which the screw is displaced. As a result, it is possible to maintain the shaft 1 in an upright posture with respect to the surface of the plasterboard 12.

When the whole thread portion is formed as a double thread, the screw threads may excessively come in contact with the tissue of the plasterboard 12 to excessively collapse the tissue, and therefore so-called play may arise between the plasterboard 12 and the screw in some cases. In the present invention, however, the portion of the thread portion on the side of the head 2 is formed of the single-thread portion 7, and therefore the tissue of the plasterboard 12 does not collapse excessively. As a result, the plasterboard 12 is firmly retained and fixed with the head of the screw.

Moreover, the frame member 13 is provided with a burr-like bulging portion 13*a* protruding in the screwed-in direction of the shaft 1 and the bulging portion 13*a* gets caught on a flank (following flank) of the screw thread to thereby prevent coming off of the screw. In the present embodiment, the bulging portion 13*a* is set to be caught only on the first screw thread 4 in the single-thread portion 7, and therefore the bulging portion 13*a* can be securely caught on the first screw thread 4.

Furthermore, in the present embodiment, the single-thread portion 7 is greater than the double-thread portion 6 both in the maximum outside diameter of the screw thread and in the root diameter. Therefore, the root portion and the first screw thread 4 tend to spread out the frame member 13 in the single-thread portion 7 and, as a result, the single-thread portion 7 is securely caught on the bulging portion 13*a* of the frame member 13 when the screw has been completely screwed in. Consequently, it is possible to secure high fastening strength of the screw.

Two plasterboards 12 are placed on each other and fastened to the frame member 13 in some cases. In such a case, a length of the single-thread portion 7 may be increased or an unthreaded portion may be provided between the single-thread portion 7 and the head 2 (it is preferable that the first screw thread 4 holds both the two plasterboards 12 in a fastened state).

The screw can also be used for fastening the plasterboard 12 to a wooden frame member. In this case, the single-thread portion 7 has mainly dug in the wooden frame member. Because the single-thread portion 7 is greater than the double-thread portion 6 both in the outside diameter (root diameter: D1, D2) of the shaft 1 and in the outside diameter (D3, D4) of the screw thread 4, 5, the single-thread portion 7 firmly dugs into the frame member. Thus, it is possible to secure high fastening strength. When the screw is used for fastening the normal plasterboard, the maximum outside diameter D4 of the thread portion is about 4 mm in many cases.

(3) Configuration of Second Embodiment

FIGS. 4A to 4D show a second embodiment. The second embodiment is different from the first embodiment only in that a self-advancing portion is formed as a drill portion 3' and other configurations are similar to those in the first embodiment. The components similar to those in the first embodiment are provided with common reference numerals in the drawings, and description thereof will be omitted when it is not especially necessary.

The drill portion 3' includes two vertical grooves 3*a* and two cutting edges 3*b* and is provided at its extreme tip end with a chisel edge. There may be three cases in which an outside diameter of the drill portion 3' (a diameter of a maximum circumscribed circle of the drill portion 3', to be exact) is equal to the outside diameter D1 of the small-diameter portion 8, slightly greater than D1, and slightly smaller than D1 and any of them can be selected.

The screw of the present embodiment is manufactured by using wire (bar) made of carbon steel or stainless steel as material. The screw threads 4, 5 are formed by rolling and the drill portion 3' is formed by cold press (forging) by using a pair of dies. The drill portion 3' can also be formed by milling (cutting). It can be subjected to heat treatment (quenching, tempering) or surface treatment as necessary.

An example of use of the screw according to the second embodiment is shown in FIGS. 5A and 5B. In this example, the screw is used for fastening the plasterboard 12 to the frame member 13 made of thin steel sheet and having a substantially C-shaped cross section similarly to the first embodiment.

In screwing in of the screw, a prepared hole is first formed in the plasterboard 12 and the frame member 13 with the drill portion 3', and the double-thread portion 6 and the single-thread portion 7 advance into the prepared hole. Because the root diameter D2 of the single-thread portion 7 is greater than the root diameter D1 of the double-thread portion 6, the frame member 13 is provided with a burr-like bulging portion 13*a* gently protruding in the screwed-in direction as the screw advances, and the bulging portion 13*a* gets caught on a flank (following flank) of the first screw thread 4 to thereby prevent coming off of the screw.

Although the screw threads 4, 5 may rise from the drill portion 3', the screw is rotated at high speed to drill the prepared hole in the frame member 13, and therefore there is a risk that tissue of the plasterboard 12 may collapse due to rotation of the screw in initial screwing when the frame member 13 has a certain degree of or greater thickness (e.g., greater than 1.2 mm). Therefore, in the present embodiment, a length L of the drill portion 3' is set to be about the same as a thickness T of the plasterboard 12. With this configuration, the screw thread 4, 5 do not or hardly reach the plasterboard 12 even when the screw rotates at high speed, and therefore it is advantageously possible to prevent the plasterboard 12 from collapsing excessively. Consequently, the present embodiment is suitable for the case in which the base such as the frame member 13 is thick.

In order to allow the head 2 of the screw to easily sink into the plasterboard 12, it is preferable that the surface-side portion of the plasterboard 12 is collapsed. Therefore, it can be said to be preferable to make the front face side portion of the plasterboard 12 liable to be collapsed by the start points of the screw threads 4, 5 in the screwing-in process.

When the screw is used for fastening to the frame member 13 made of thin steel sheet, it can be said that the pitches of the screw threads 4, 5 are preferably small in general. Therefore, the pitches (or lead angles) of the screw threads 4, 5 can be set to such dimensions that the feet of the adjacent screw threads 4, 5 are in close contact with or close to each other in the double-thread portion 6 and that the flat root is exposed between the feet of the adjacent screw threads 4 in the single-thread portion 7.

(4) Third Embodiment

A third embodiment shown in FIG. 6 is a variation of the second embodiment. In this embodiment, the first screw thread 4 and the second screw thread 5 respectively rise from the drill portion 3'. In other words, the start points of both the screw threads 4, 5 are located in the drill portion 3'. Other configurations are similar to those of the second embodiment.

(5) Fourth Embodiment

FIG. 7 schematically shows a fourth embodiment. The fourth embodiment is a variation of the first embodiment. In other words, in the present embodiment, the first screw thread 4 has a constant outside diameter D8 in the double-thread portion 6 and the single-thread portion 7. Therefore, a height of the first screw thread 4 is smaller in the large-diameter portion 7' than in the small-diameter portion 8. The outside diameter D5 of the second screw thread 5 is smaller than the outside diameter of the first screw thread 4.

(6) Fifth and Sixth Embodiments

FIG. 8A shows a fifth embodiment and FIG. 8B shows a sixth embodiment. In each of the fifth and sixth embodiments, heights of the first screw thread 4 and the second screw thread 5 in the double-thread portion 6 are the same as each other. Therefore, in the double-thread portion 6, both the screw threads 4, 5 have the same outside diameter D9. In the fifth embodiment, the self-advancing portion is formed as a narrow-tip portion 3. In the sixth embodiment, the self-advancing portion is formed as a drill portion 3'.

(7) Others

The invention of the present application can be embodied in various ways in addition to the above-described embodiments. For example, the fitting portion which is formed in the head and in which the driver bit is to be fitted is not limited to the cross-shaped recess. Various types of fitting portions such as a square socket and a hexagon socket can be employed. It is possible to form a cutting edge for whittling the workpiece on a bearing surface of the head. When the drill portion is employed as the self-advancing portion, various forms of the drill portion can be employed. For example, a square pyramid shape can be employed. Although the screw of the invention of the present application is suitable for fastening of the plasterboard, it can be used also for fastening of heat insulation material, for example.

What is claimed is:

1. A self-advancing screw, comprising:
    a shaft having a circular cross section;
    a head contiguously provided to a base end of the shaft, the head having a trapezoidal cone portion with an outside diameter thereof increasing from a portion connected to the shaft toward a top face, and further defining a fitting portion in which a driver bit is to be fitted and which is formed in the top face of the head, a bearing surface of the trapezoidal cone portion forming the head having a profile including an outline curved to be recessed from outside in a vertical cross-sectional front view taken along a plane including an axis, which forms the head as an outwardly flared structure;
    a tip end portion of the shaft on a side opposite to the head being formed as a self-advancing portion for advancing into a member without a prepared hole, the self-advancing portion comprising a narrow-tip portion having a pointed extreme tip end;
    the shaft further including a small-diameter portion contiguous to the self-advancing portion and a large-diameter portion contiguous to the head, a tapered portion being interposed between the small-diameter portion and the large-diameter portion contiguous therewith;
    the small-diameter portion of the shaft being provided with two screw threads including a first screw thread and a second screw thread, only the first screw thread out of the two screw threads extending proximate to the head, such that the small-diameter portion of the shaft is formed as a double-thread portion and the large-diameter portion is formed as a single-thread portion;
    an outside diameter of the single-thread portion being greater than or substantially the same as a maximum outside diameter of the double-thread portion, an outside diameter of the second thread being less than a corresponding outside diameter of the first thread formed in the double-thread portion;
    the head including a flat flange portion overhanging outward from an outer periphery of the trapezoidal cone portion, an outside diameter of the curved trapezoidal cone portion being approximately twice a maximum outside diameter of the screw threads, an outside diameter of the flange portion being 2.5 to 3.5 times the maximum outside diameter of the screw threads; and
    spaces being left between bases of the adjacent screw threads on the shaft.

2. A self-advancing screw according to claim 1, wherein an outside diameter of the first screw thread is greater than an outside diameter of the second screw thread in the small-diameter portion of the shaft and an outside diameter of the first screw thread in the large-diameter portion is greater than the outside diameter of the first screw thread in the small-diameter portion.

3. A self-advancing screw according to claim 1, wherein an outside diameter of the first screw thread and an outside diameter of the second screw thread are the same as each other in the small-diameter portion of the shaft, and an outside diameter of the first screw thread in the large-diameter portion is greater than outside diameters of both the screw threads in the small-diameter portion.

* * * * *